L. HALE.
Hay Tedder.

No. 112,030. Patented Feb. 21, 1871.

Witnesses:
Cha. Kenyon,
Villette Anderson,

Inventor:
L. Hale
Chipman Hosmer & Co.
Attys.

United States Patent Office.

LUKE HALE, OF HOLLIS, NEW HAMPSHIRE.

Letters Patent No. 112,030, dated February 21, 1871

IMPROVEMENT IN HAY-TEDDERS.

The Schedule referred to in these Letters Patent and making part of the same.

*To all whom it may concern:*

Be it known that I, LUKE HALE, of Hollis, in the county of Hillsborough and State of New Hampshire, have invented a new and valuable Improvement in Hay-Tedders; and I do hereby declare that the following is a full, clear, and exact description of the construction and operation of the same, reference being had to the annexed drawing making a part of this specification, and to the letters and figures of reference marked thereon.

Figure 1:
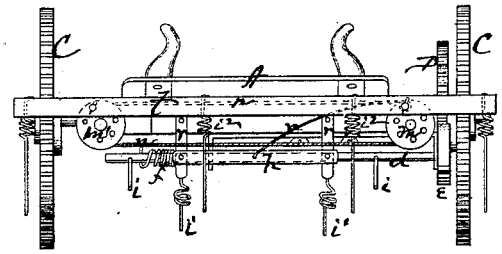
Figure 1 is a representation of my machine in rear elevation.
Figure 2:
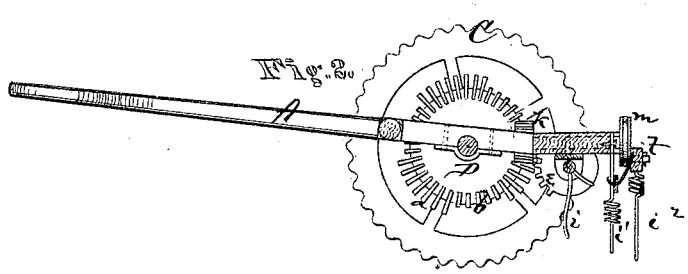
Figure 2 is a longitudinal vertical section.
Figure 3:
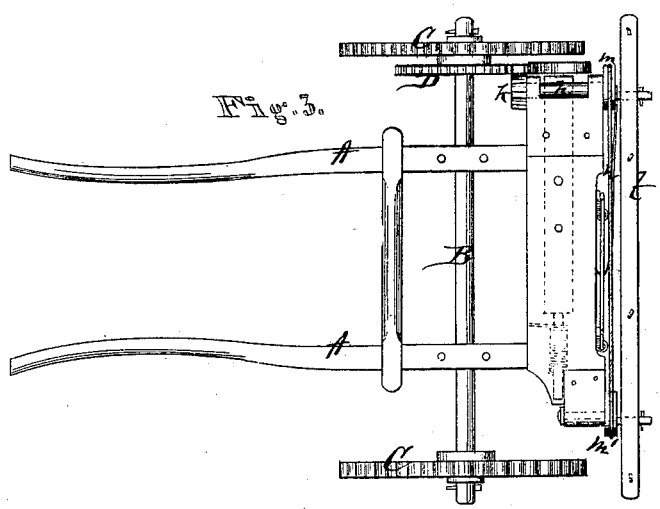
Figure 3 is a plan view of the same.

The nature of my invention consists in the construction and arrangement of a hay-tedder, as will be hereinafter more fully set forth.

In order to enable others skilled in the art to which my invention appertains to make and use the same, I will now proceed to describe its construction and operation, referring to the annexed drawing.

A represents the frame of my machine mounted upon the axle B, having a driving-wheel, C, at each end.

Near one of the wheels, upon the axle B, is placed a cog-wheel, D, which is provided with cogs $a\ a$ and $b\ b$, the former extending beyond the latter, around the periphery of the wheel, and all extending inward from the periphery toward the center for a short distance.

These cogs are so arranged that a certain number of long and short cogs alternate around the entire wheel.

On the under side of the rear end of the frame A is mounted a shaft, $d$, provided at one end with a cogged segment, $e$, made to gear with the long teeth $a$ of the wheel D.

Around this shaft is twisted a spring, $f$, and to the shaft are secured the spring fingers $i\ i$.

The machine being in motion, the cogs $a\ a$ turn the segment $e$, and with it the shaft and fingers for a short distance. As soon as the cogs $a$ let go, and while the cogs $b$ are passing, the spring $f$ throws the shaft back, so that the next set of cogs $a$ will again catch in the segment $e$ and turn the same.

At the rear end, on one side of the frame A, is a small shaft, $h$, having on its inner end a pinion, $k$, which gears with the inner ends of the cogs $a\ b$ on the wheel D, and has on its outer end a crank-wheel, $m$, connected by a rod, $n$, with a bar, $p$. This bar connects a series of arms $r\ r$, to the lower ends of which the spring fingers $i^1$ are attached, said fingers thus obtaining a reciprocating side motion, and serving to scatter the hay right and left after it has been thrown backward by the spring fingers $i\ i$.

On the opposite side, at the rear end of the frame A, is pivoted another crank-wheel, $m'$, and the two crank-wheels are connected by a belt, $s$.

On said wheels is pivoted a bar, $t$, to which a series of spring fingers, $i^2$, is secured, said bar and fingers thus also obtaining a reciprocating side motion, and serving to spread the hay more evenly on the ground after the action of the tossing-fingers $i$ and $i^1$.

Having thus fully described my invention,

What I claim as new, and desire to secure by Letters Patent, is—

1. The shaft $d$, with fingers $i\ i$, spring $f$, and cogged segment $e$, in combination with the wheel D, having alternate arcs of unequal cogs $a\ b$, all constructed and arranged to operate substantially as and for the purposes herein set forth.

2. The arms $r\ r$, with fingers $i^1\ i^1$, bar $p$, rod $n$, crank-wheel $m$, and pinion $k$, in combination with the cog-wheel D, all constructed and arranged to operate substantially as herein set forth.

3. The bar $t$, with teeth or fingers $i^2\ i^2$, crank-wheels $m\ m'$, shaft $h$, and pinion $k$, in combination with the cog-wheel D, all constructed and arranged to operate substantially as and for the purposes herein set forth.

In testimony that I claim the above I have hereunto subscribed my name in the presence of two witnesses.

LUKE HALE.

Witnesses:
HENRY B. ATHERTON,
SAML. T. WORCESTER.